US008982269B2

(12) United States Patent
Tecu

(10) Patent No.: US 8,982,269 B2
(45) Date of Patent: Mar. 17, 2015

(54) MECHANICAL ASSEMBLY FOR FINE FOCUS OF A WAFER-LEVEL CAMERA MODULE, AND ASSOCIATED METHODS

(75) Inventor: Kirk Tecu, Longmont, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 158 days.

(21) Appl. No.: 12/891,380

(22) Filed: Sep. 27, 2010

(65) Prior Publication Data

US 2012/0075520 A1 Mar. 29, 2012

(51) Int. Cl.
*G03B 13/00* (2006.01)
*H04N 5/232* (2006.01)
*G03B 43/00* (2006.01)
*G03B 17/12* (2006.01)

(52) U.S. Cl.
CPC .............. *G03B 43/00* (2013.01); *G03B 17/12* (2013.01)
USPC ........................................ 348/345; 348/373

(58) Field of Classification Search
CPC ...... H04N 5/2251; H04N 5/2252; H05K 5/00
USPC .......................................... 348/373, 374, 345
See application file for complete search history.

(56) References Cited

U.S. PATENT DOCUMENTS

| 7,311,453 | B2 * | 12/2007 | Li | 396/529 |
| 8,190,013 | B2 * | 5/2012 | Chen | 396/133 |
| 2004/0166763 | A1 * | 8/2004 | Hanada et al. | 445/51 |
| 2005/0285016 | A1 * | 12/2005 | Kong et al. | 250/208.1 |
| 2006/0050417 | A1 * | 3/2006 | Ooi et al. | 359/819 |
| 2006/0066746 | A1 * | 3/2006 | Lee et al. | 348/357 |
| 2006/0132644 | A1 * | 6/2006 | Shangguan et al. | 348/374 |
| 2006/0181633 | A1 * | 8/2006 | Seo | 348/340 |
| 2006/0193064 | A1 * | 8/2006 | Kim | 359/811 |
| 2007/0012864 | A1 * | 1/2007 | Webster | 250/208.1 |
| 2007/0241273 | A1 * | 10/2007 | Kim et al. | 250/239 |
| 2008/0224192 | A1 * | 9/2008 | England et al. | 257/294 |
| 2008/0252775 | A1 * | 10/2008 | Ryu et al. | 348/374 |
| 2008/0305828 | A1 * | 12/2008 | Chang et al. | 455/556.1 |
| 2009/0206431 | A1 * | 8/2009 | Bolken et al. | 257/432 |
| 2010/0053391 | A1 * | 3/2010 | Huang | 348/294 |

FOREIGN PATENT DOCUMENTS

| TW | 472369 | 1/2002 |
| TW | M289862 | 4/2006 |
| WO | 2009067832 A1 | 6/2009 |

OTHER PUBLICATIONS http://www.heptagon.fi/index.php?page=cmos-imaging-solutions, printed Nov. 24, 2010, admitted prior art for the current application, 3 pages.

(Continued)

*Primary Examiner* — Nelson D. Hernández Hernández
(74) *Attorney, Agent, or Firm* — Lathrop & Gage LLP

(57) ABSTRACT

A mechanical assembly for fine focus of a wafer-level camera module includes a threaded lens acceptor for mounting with a wafer-level compatible image sensor and a complimentary threaded lens base for mounting with a wafer-level lens stack. In a method of forming a wafer-level camera with a mechanical fine focus assembly, the lens base and the lens acceptor rotationally couple to join the lens stack with the sensor, and to adjust z-height of the camera module to achieve optimal focus. The camera module is secured at the optimal focus position.

13 Claims, 7 Drawing Sheets

(56) References Cited

OTHER PUBLICATIONS http://www.heptagon.fi/index.php?page=camera-module-assembly-options, printed Nov. 24, 2010, admitted prior art for the current application, 3 pages.

http://www.heptagon.fi/index.php?page=imaging-resolutions, printed Nov. 24, 2010, admitted prior art for the current application, 3 pages.

Machine Translation of Taiwanese Utility Patent M289862.

Taiwanese Patent Application 100134929 Office Action dated Nov. 23, 2014, 7 pages.

Concise Explanation of Relevance of Foreign Language Documents in Accordance with 37 CFR 1,98(1)(3)(I) for Office Action in Taiwanese Patent Application 100134929, 5 pages.

* cited by examiner

MECHANICAL ASSEMBLY FOR FINE FOCUS OF A WAFER-LEVEL CAMERA MODULE, AND ASSOCIATED METHODS

BACKGROUND

Wafer-level optics is an increasingly common technology for providing cost-effective, higher resolution miniaturized cameras for integration into personal devices such as cell phones, MP3 players, notebook computers and the like. With wafer-level camera technology, layers of transparent material (e.g., glass) are aligned and bonded together, optionally with additional spacer and filter layers to form a wafer assembly. The wafer assembly is diced to form multi-element lens stacks 10, as illustrated in prior art FIG. 1. Lens stacks 10 may be enclosed in a protective housing 12. Each lens stack 10 is subsequently mounted directly onto an image sensor 14 such that an aperture 16 of lens stack 10 aligns with an active area 18 of image sensor 14, to form an individual and extremely compact camera module 20. Entire cameras may be aligned and assembled at the wafer level and subsequently diced to form the individual modules.

SUMMARY

The wafer level compatible assembly and method of the present invention was developed in light of focus adjustment problems common to conventional wafer-level camera modules.

In one embodiment, a mechanical assembly for fine focus of a wafer-level camera module includes a threaded lens acceptor for mounting with a wafer-level compatible image sensor, and a complimentary threaded lens base for mounting with a wafer-level lens stack.

In one embodiment, a wafer-level camera module with a mechanical fine focus assembly includes a wafer-level compatible image sensor and a wafer-level lens stack. A threaded lens acceptor mounts with a top surface of the image sensor and a threaded lens base complimentary to the lens acceptor mounts with a bottom surface of the lens stack. The lens stack and the lens acceptor rotationally couple to join the image sensor and the lens stack.

In one embodiment, a method of forming a wafer-level camera with a mechanical fine focus assembly includes attaching a threaded base assembly with a bottom surface of a wafer-level lens stack, and attaching a threaded lens acceptor with a top surface of an image sensor sized for coupling with the lens stack. The base assembly is placed with the lens acceptor and the base assembly and lens acceptor are rotationally coupled to achieve optimal module focus. The lens stack and the image sensor are secured at a position corresponding to the optimal focus.

In one embodiment, a method of fine, die level focus adjustment of a wafer-level camera module includes coupling a threaded lens base of a wafer-level lens stack with a complimentary acceptor of a wafer-level sensor to form a camera module. One or both of the lens base and the lens acceptor are rotated to achieve an optimal module focus position. The module is secured at the optimal focus position.

DETAILED DESCRIPTION

After an array of lens stack assemblies is built in wafer form, back focal lengths for individual lens stacks may differ slightly from one another due to various factors in fabrication of the array. Where standard deviation of the back focal length is considerably large, the distance between each lens stack and an associated image sensor (sensor-to-stack spacing) must be individually adjusted to fine focus the stack and sensor assembly prior to permanently joining the lens stack with its image sensor. Since this individual adjustment may be performed after the wafer is diced into individual dies, it may be referred to as die level focus adjustment.

Figure 1:
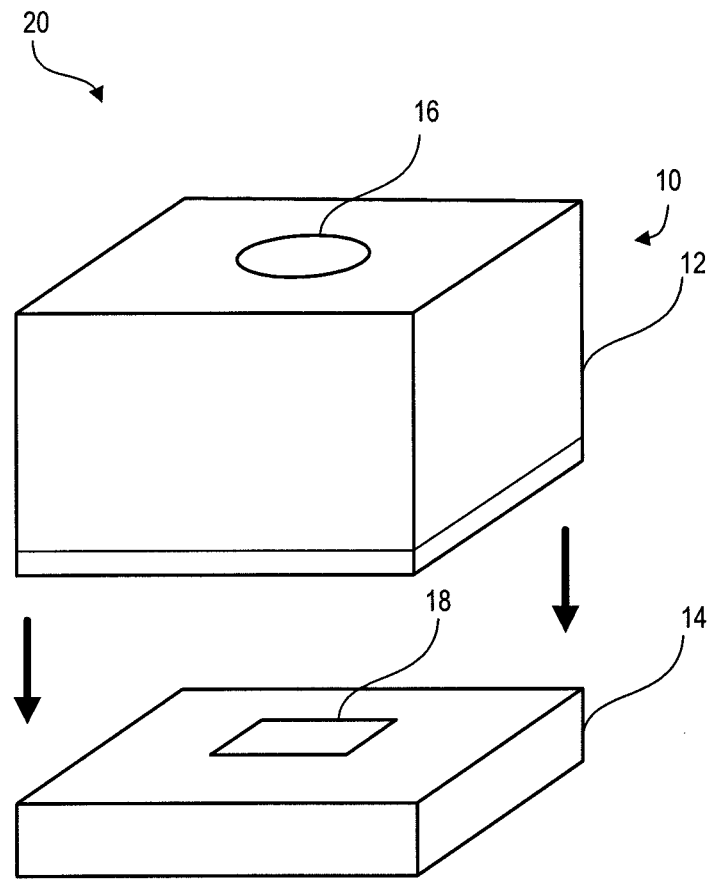
FIG. 1 is a perspective view of a prior art wafer-level camera module.
Figure 2A:
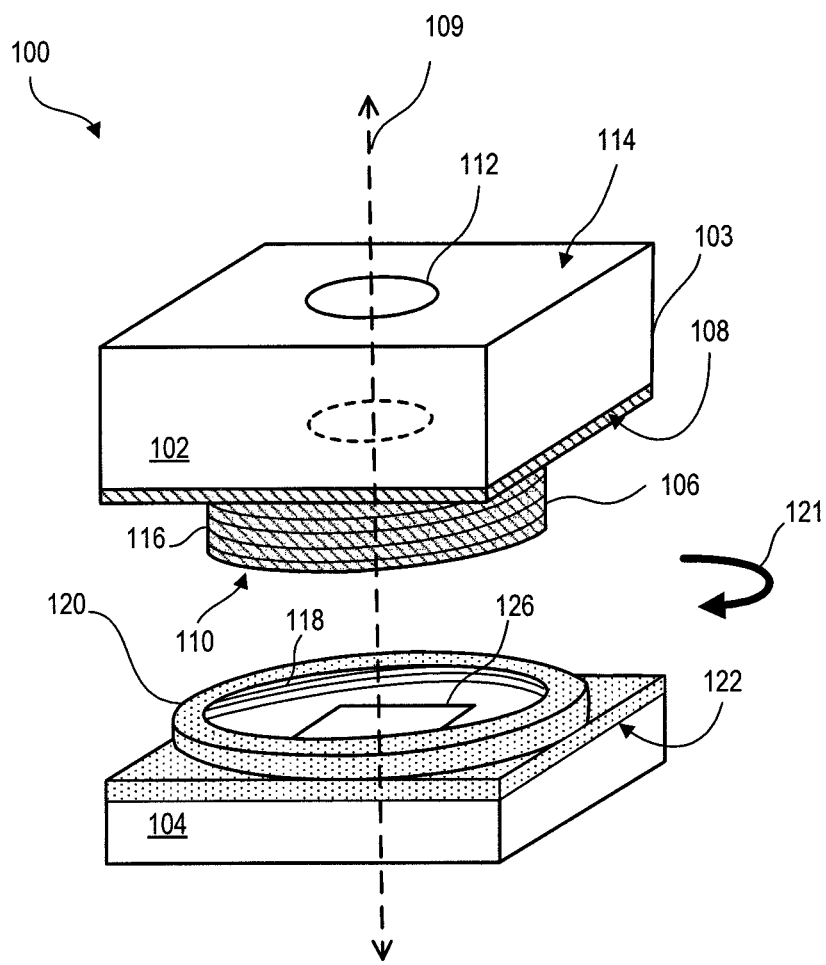
FIG. 2A is a pre-assembly, perspective view of an exemplary wafer-level camera module with a mechanical fine focus assembly including a lens base affixed with a lens stack and a lens acceptor affixed with a sensor, in an embodiment.
Figure 2A:
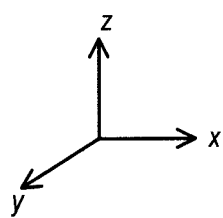
Figure 2B:
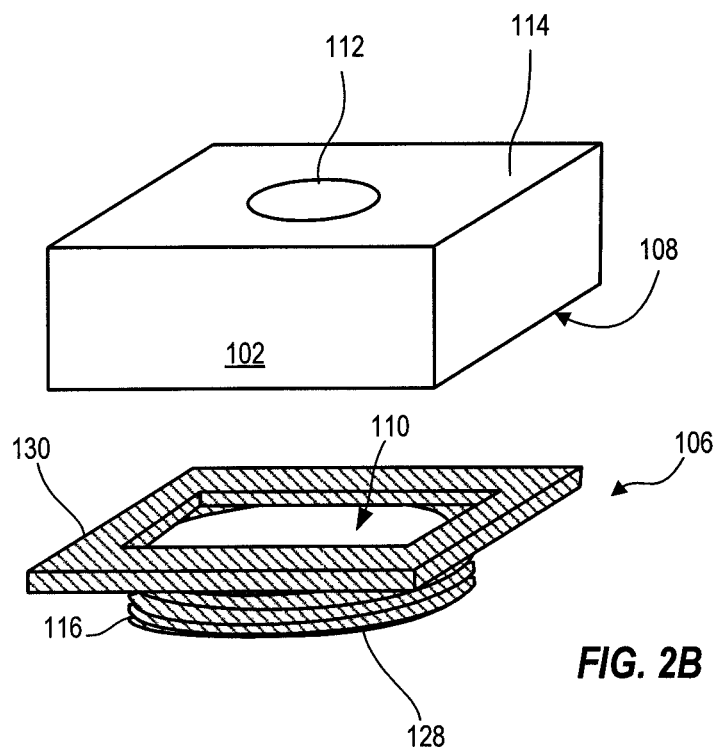
FIG. 2B is an exploded view of the wafer-level lens stack with lens base of FIG. 2A.
Figure 2C:
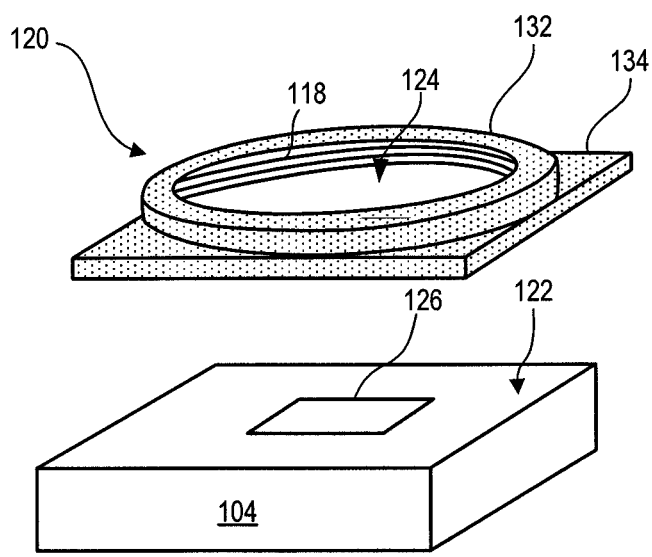
FIG. 2C is an exploded view of the wafer-level sensor with lens acceptor of FIG. 2A.

FIG. 2A illustrates a camera module, and FIGS. 2B and 2C show details of certain module components. FIGS. 2A-2C are best viewed together with the following description.

FIG. 2A shows a pre-assembly camera module 100 including a wafer-level lens stack 102 having a housing 103, and a wafer-level compatible sensor 104. A lens base assembly 106 (alternately referred to as "lens base 106" or simply "base 106") fixedly attaches to a bottom surface 108—the stack surface intended for placement proximate sensor 104—of lens stack 102. Bottom surface 108 (see FIG. 2B) may correspond to a bottom surface of a backspacer applied to stack 102 if desired; however, the inventions disclosed herein may eliminate the need for a backspacer.

Figure 3A:
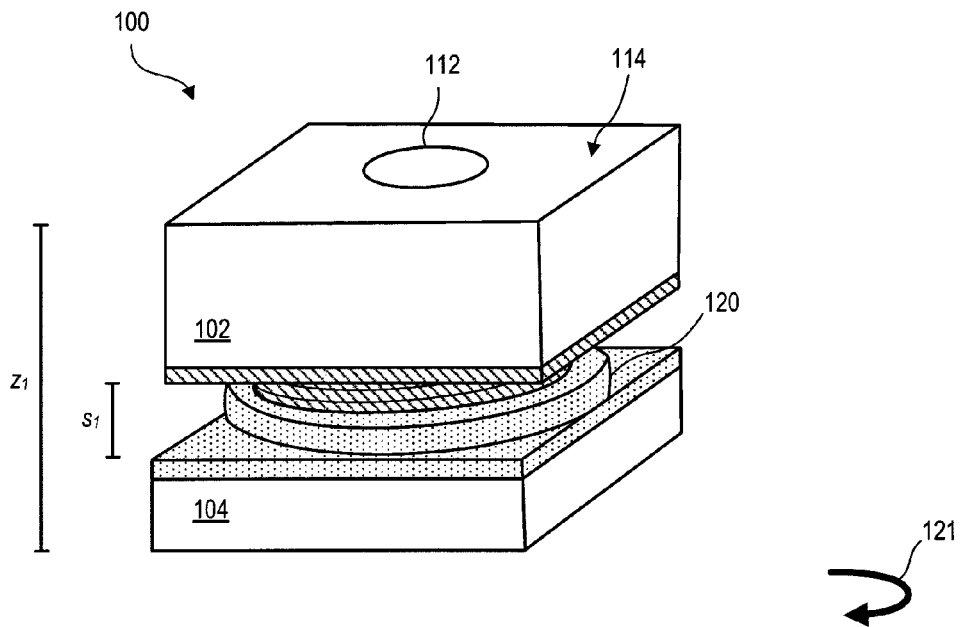
FIG. 3A is a perspective view of the module of FIG. 2A assembled with a first z-height.
Figure 3B:
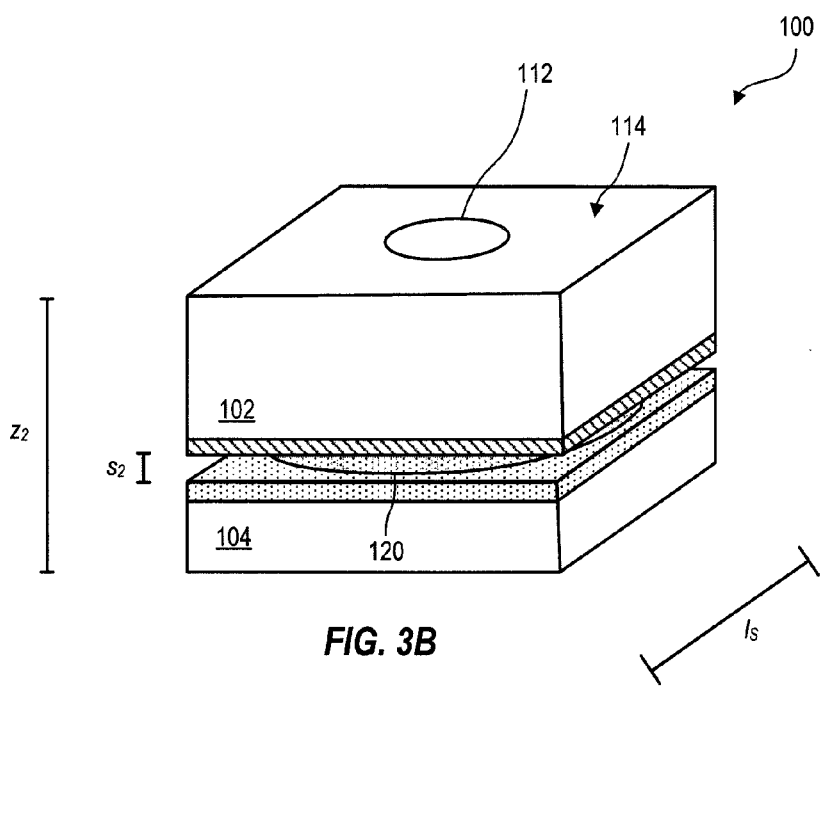
FIG. 3B is a perspective view of the module of FIGS. 2A and 3A assembled with a second z-height.
Figure 5:
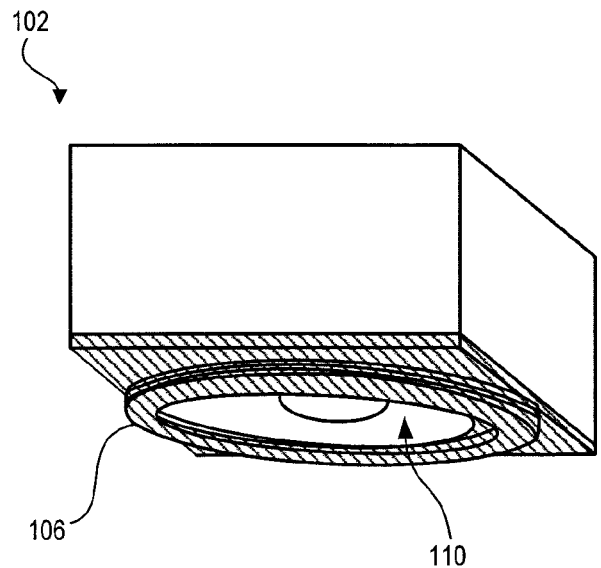
FIG. 5 is a perspective view showing additional detail of a lens stack and a lens base of the module of FIGS. 2A-3B.

Lens base 106 is centered about an optical axis 109 of lens stack 102 such that a through-hole 110 (see also FIG. 5) of lens base 106 also aligns with the optical axis and aperture rays entering lens stack 102 via a lens stack aperture 112 on a top surface 114 of stack 102 may pass through to an active areas 126 of sensor 104 when lens stack 102 and sensor 104 are coupled together. Lens base 106 for example includes threading 116 for mating with complimentary threading 118 of a lens acceptor assembly 120 (also referred to as "lens acceptor" or "acceptor" 120) configured (fixedly attached) with a top or sensing surface 122 of sensor 104. Lens stack 102 may thus be joined with sensor 104 by aligning base 106 with acceptor 120 and rotating one or both of lens stack 102 and sensor 104 to screw the two together, for example as depicted in FIGS. 3A and 3B. For example, lens stack 102 may be rotated in a clockwise direction, as indicated by directional arrow 121, to join lens stack 102 with sensor 104. It will be appreciated that in place of threading 116 and 118, base 106 and acceptor 120 may incorporate another tunable height varying technology capable of being locked in place.

For example, base 106 may be configured to fit snuggly within acceptor 120 such that pressure must be exerted to move the two together or apart, and once in the correct position, base 106 and acceptor 120 may be permanently fixed (e.g., using glue).

Like lens base 106, lens acceptor 120 includes a through hole 124 (FIG. 2C) for facilitating passage of aperture rays from lens stack 102 to sensor active area 126. Complimentary threading of lens base 106 and lens acceptor 120 facilitates adjustment (e.g., by rotation of lens stack 102 in relation to sensor 104) of a sensor-to-stack spacing, and thereby facilitates adjustment of relative z-height (height in the z direction) of module 100. For example, as illustrated by FIGS. 3A and 3B, spacing between lens stack 102 and sensor 104 is variable along a continuum from a first, greatest spacing $s_1$ to a second, smallest spacing $s_2$ when lens base 106 and acceptor 120 are joined and stack 102 is rotated in the direction of arrow 121 relative to sensor 104. Varying center-to-stack spacing as such results in variation of z-height along a continuum from a first and greatest z-height $z_1$ to a lowest z-height $z_2$. The range between $z_1$ and $z_2$/$s_1$ and $s_2$ may be selected for compatibility with a focus range needed for a given wafer-level camera design. For example, a range in hundredths of micrometers may be provided for VGA and Megapixel wafer level camera designs.

In one aspect, lens base 106 includes a cylindrical element 128 defining through hole 110 and a base plate 130 for fixing (e.g., gluing or otherwise permanently fastening) with bottom surface 108 of lens stack 102. Alternately, cylindrical element 128 may be affixed directly to surface 108 without an intervening base plate 130. Likewise, in one aspect, lens acceptor 120 includes a cylindrical element 132 configured with a base plate 134 that attaches (e.g., by gluing or other manner of permanent attachment) to surface 122 of sensor 104. FIGS. 2A-3C depict lens base 106 and lens acceptor 120 as including a base plate. Alternately, cylindrical element 132 may be affixed directly to surface 122 without intervening plate 134.

Where it is desirable or necessary to avoid lens stack 102 corners overhanging the sides of sensor 104 (which may for example occur if an optimal focus position is achieved by rotating lens stack 102 at a 45° angle with respect to sensor 104), lens stack 102 may be sized such that a vertical distance linking opposing corners across stack 102 is less than the length and width of sensor 104. Alternately, the lens stack may be cut into a cylindrical rather than a cube shape (i.e., plug cut rather than die cut), as shown in FIG. 4.

Figure 4:
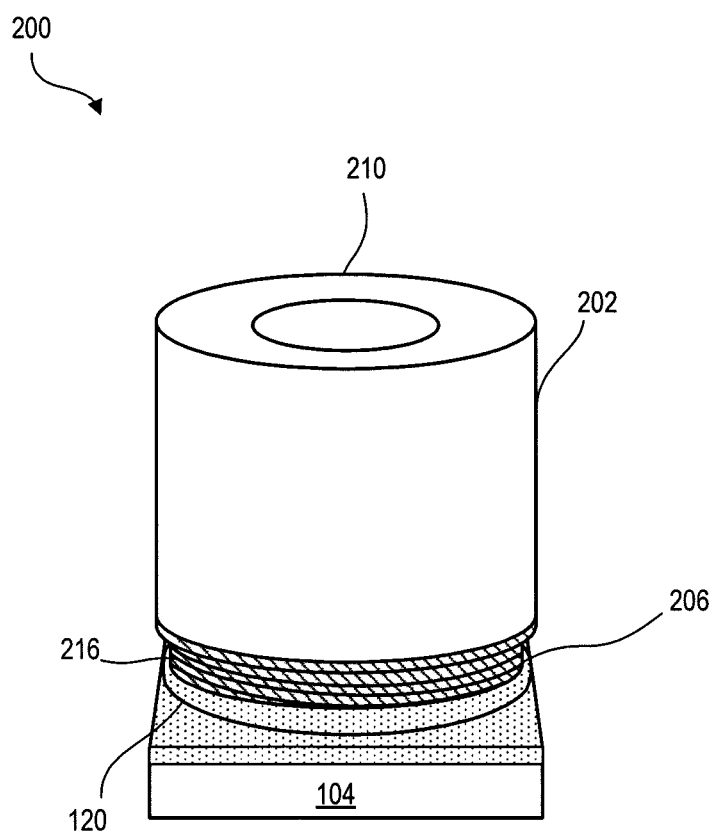
FIG. 4 is a perspective view of an exemplary wafer-level camera module having a cylindrical lens stack and a mechanical assembly for fine focus adjustment, in an embodiment.

FIG. 4 is a perspective view of an assembled camera module 200 including sensor 104 with associated lens acceptor 120, coupled with a lens stack 202 having a lens base 206 configured therewith. Lens base 206 is shown with outer threads 216 that are complimentary to inner threads 118 of acceptor 120 (FIG. 2). Base 206 includes a through hole (not shown) similar to that described with respect to base 106, for permitting passage of light to active area 126 As described above with respect to stack 102 and sensor 104, lens base 206 rotationally couples with acceptor 120 to provide a spacing range between stack 202 and sensor 104 and a corresponding range in module 200 z-height (similar to spacings $s_1$ and $s_2$ and heights $z_1$ to $z_2$ as shown and described above with respect to FIGS. 3A and 3B), for adjusting module 200 focus.

Lens stack 202 diameter $d_{LS}$ may be equal to or less than sensor 104 width $w_S$ and length $l_S$ (see FIG. 3B) such that, regardless of the degree of rotation of lens stack 202 (and/or sensor 104), stack 202 does not overhang sensor 104.

It will be appreciated that although FIGS. 2-6 depict lens base 106/206 as a male assembly and lens acceptor 120 as a female assembly, base 106/206 may alternately be female where acceptor 120 is male. It will also be appreciated that although not shown, lens stack 102/202 may include multiple lenses and lens optics, such as spacers and filters.

In one aspect, module 100 or 200 is assembled at the singulated die level. Lens base 106/206 is applied to an intended bottom (sensor side) surface of formed and diced lens stack 102/202, respectively, and lens acceptor 120 is applied to an intended top surface of sensor 104. An assembler for example joins lens stack 102/202 and sensor 104 by aligning base 106/206 with acceptor 120 and rotating lens stack 102/202 with respect to sensor 104. An optimal focus position is determined and lens stack 102/202 is for example rotated until the optimal focus position (corresponding with an optimal z-height of module 100) is achieved. Optimal focus position may be determined directly (e.g., visually) by an assembler or via a software algorithm. In one example, light is transmitted through the lens stack and the beam reflected off of the sensor analyzed to determine any necessary adjustments to z-height of module 100. Sensor 104 may be operational and may image a target to allow the assembler to view the active image taken by the sensor and to adjust module 100 z-height until the active image is optimally focused. In another example, a software algorithm analyzes the active image taken by the sensor through the lens stack to determine optimal focus position. When optimal focus position/z-height are achieved, lens stack 102/202 and sensor 104 are bonded in place at the optimal position/height, for example by gluing base 106/206 and acceptor 120 and/or stack 102/202 and sensor 104 together.

Figure 6:
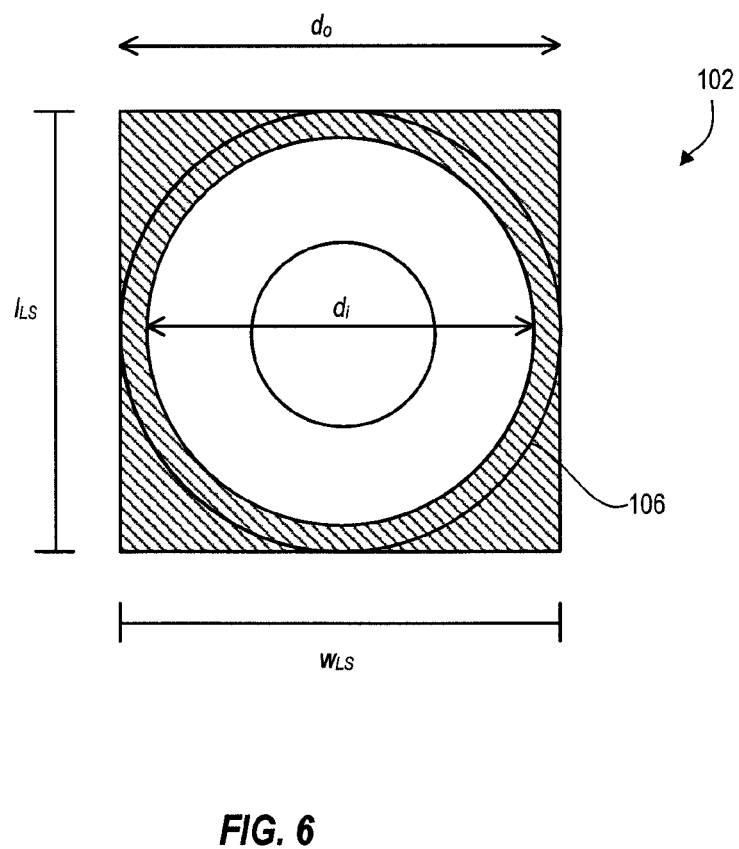
FIG. 6 is a schematic bottom view of the lens stack and lens base of FIGS. 2-3B and 5.

Lens base 106/206 and acceptor 120 may be formed with dimensions compatible to those of a wafer level camera. For example, as shown in FIG. 6, outer dimensions of lens base 106/206 are similar or equivalent to the dimensions of lens stack 102. An outer diameter $d_o$ of base 106 may be approximately equal to length $l_{LS}$ and width $w_{LS}$ of lens stack 102. An inner diameter $d_i$ of base 106 defines a through hole 110 large enough to allow all rays from lens stack 102 to couple with active area 126 of sensor 104 when lens stack 102 and sensor 104 join via base 106 and acceptor 120.

Figure 7:
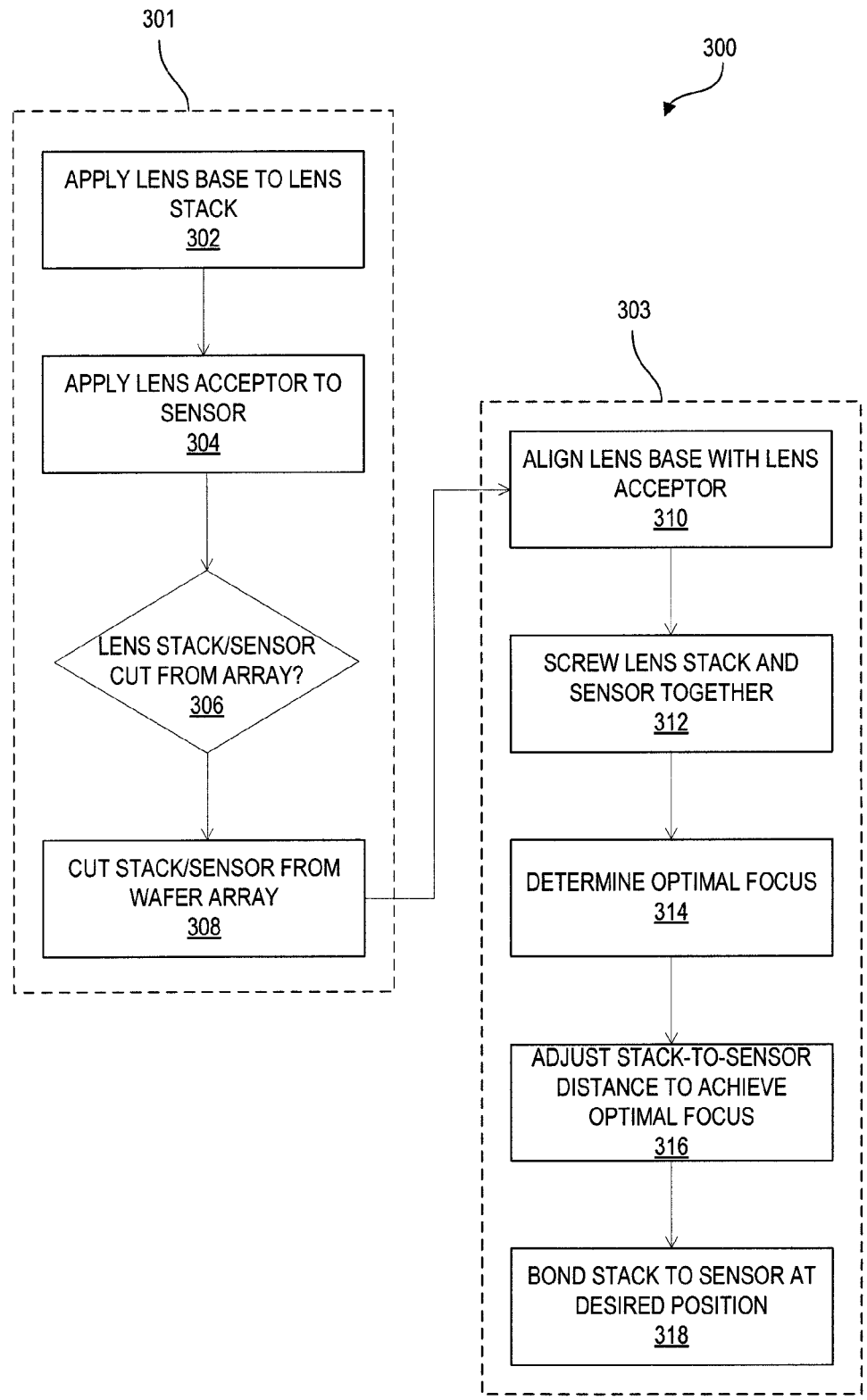
FIG. 7 is a flowchart illustrating one exemplary method of forming and utilizing a mechanical assembly for fine focus of a wafer-level camera module, in an embodiment.

FIG. 7 illustrates a method 300 of forming and utilizing a mechanical fine-focus assembly with a wafer-level camera module. Steps 302-318 represent an assembly forming sub-method 301, and steps 310-318 represent a sub-method 303 of fine-focusing a wafer-level camera. It will be appreciated that sub-methods 301 and 303 may stand alone and need not be utilized together in a single forming and utilizing method.

In step 302, a lens base is applied to a bottom (sensor side) surface of a lens stack. In step 304, a lens acceptor is applied to a top surface of a sensor. In one example of steps 302 and 304, lens base 106 is centered about the optical axis of lens stack 102 and applied to surface 108, and lens acceptor 120 is applied to surface 122 of sensor 104, centered about active area 126.

If the lens base and acceptor were applied prior to dicing the lens stacks and sensors from their respective wafer arrays (decision 306), the lens stack and sensor are die-cut (or optionally, the lens stacks are plug-cut), in step 308. In one example of step 308, a plurality of lens stacks 102 and sensors 104 are die-cut in cube form from wafer arrays. In another example of step 308, a plurality of sensors 104 are die-cut from a wafer array and plug-cutting is used to form a plurality of cylindrical lens stacks 202 from a wafer array.

In step 310, the lens base (with attached lens stack) is aligned with the lens acceptor attached to the sensor. In one example of step 310, threading 116 of base 106 is aligned for rotational coupling with threading 118 of acceptor 120. The lens stack and sensor are then rotationally secured/screwed together to form a camera module (i.e., module 100 or 200), in step 312. Focus of the camera module is adjusted in steps 314 and 316.

In step 314, an optimal focus position is determined and in step 316, stack-to-sensor spacing and thus z-height is adjusted to achieve optimal focus. In one example of steps 314 and 316, optimal z-height or stack-to-sensor spacing of module 100 is calculated, and lens stack 102 is rotated in a clockwise direction to reduce z-height or in a counterclockwise direction to increase z-height, until the optimal z-height is achieved. In another example of steps 314 and 316, an assembler visually determines optimal focus by rotating lens stack 102 back and forth until focus is optimized. The camera module is secured at the optimal focus position by bonding the lens stack to the sensor, in step 318. In one example of step 318, glue is applied in the space between lens stack 102 and sensor 104. In another example of step 318, glue is applied between threads 116 and threads 118 thereby preventing rotation of lens stack 102 in relation to sensor 104.

It will be appreciated that as an alternative to sub-method 301, a lens base 106/206 may be applied (fixedly attached) to each of a plurality of un-cut lens stacks in a lens wafer array. For example, one base 106/206 is centered and applied about the optical axis of each un-cut lens stack 102/202 in a lens wafer array. Single stacks 102/202 are then die-cut or plug-cut from the wafer array, and subsequently attached at the singulated die level with individual sensors 104 with applied (fixedly attached) lens acceptors 120. Lens acceptors 120 may also be applied to a wafer array of sensors 104 prior to dicing.

While the present invention has been described above, it should be clear that many changes and modifications may be made to the process and product without departing from the spirit and scope of this invention. For example, components and methods described with respect to camera module 100 may be equally applied to camera module 200 where appropriate, and vice-versa.

What is claimed is:

1. A wafer-level camera module with a mechanical fine focus assembly, comprising:
   a wafer-level compatible image sensor;
   a threaded lens acceptor mounted with a top surface of the image sensor;
   a wafer-level lens stack, wherein the wafer-level lens stack is built in wafer form and diced into singulated die level; and
   a threaded lens base complimentary to the threaded lens acceptor, the threaded lens base including (a) a flat first side fixedly attached to a bottom surface of the wafer-level lens stack and (b) a threaded second side configured for rotationally coupling with the threaded lens acceptor to join the image sensor and the wafer-level lens stack;
   wherein an outer diameter of the threaded lens base is equal to a length and a width of the wafer-level lens stack.

2. The module of claim 1, wherein rotation of the lens stack relative to the image sensor adjusts focus of the camera module by changing relative z-height, when the lens base couples with the lens acceptor.

3. The module of claim 1, the lens acceptor comprising a female acceptor and the complimentary lens base comprising a male base.

4. The module of claim 1, the lens acceptor comprising a male acceptor and the complimentary lens base comprising a female base.

5. The module of claim 1, the lens acceptor and the lens base comprising apertures therethrough for forming a conduit for light to pass to the image sensor, when the lens stack couples with the image sensor.

6. The module of claim 1, the wafer-level lens stack being shaped as a cylinder and the image sensor having a cube form.

7. A method of forming a wafer-level camera with a mechanical fine focus assembly, comprising:
   fixedly attaching a flat first side of a threaded base assembly to a bottom surface of a wafer-level lens stack;
   attaching a threaded lens acceptor with a top surface of an image sensor sized for coupling with the lens stack;
   placing the base assembly with the lens acceptor; and
   rotationally coupling the base assembly with the lens acceptor to achieve optimal camera focus; and
   securing the camera at a position corresponding to the optimal focus;
   wherein an outer diameter of the threaded base assembly is equal to a length and a width of the wafer-level lens stack, and
   wherein the wafer-level lens stack is built in wafer form.

8. Method of claim 7, wherein securing comprises gluing the lens stack and the image sensor in place at the optimal focus position.

9. Method of claim 7, wherein placing and rotationally coupling comprise inserting a male base assembly into a female lens acceptor and rotating the lens stack or the image sensor in a clockwise direction to couple the lens stack with the image sensor.

10. Method of claim 7, wherein placing and rotationally coupling comprise inserting a male lens acceptor into a female base assembly and rotating the lens stack or the image sensor in a clockwise direction to couple the lens stack with the image sensor.

11. Method of claim 7, wherein rotationally coupling comprises rotating the lens stack or the image sensor to achieve a desired module z-height.

12. Method of claim 7, further comprising the step of determining the optimal focus position.

13. A method of fine, die level focus adjustment of a wafer-level camera module, comprising:
   coupling a threaded lens base, having a flat first side fixedly mounted to a bottom surface of a wafer-level lens stack, with a complimentary lens acceptor mounted with a wafer-level sensor, to form a camera module;
   rotating one or both of the threaded lens base and the lens acceptor to achieve an optimal module focus position; and
   securing the module at the optimal focus position;
   wherein an outer diameter of the threaded lens base is equal to a length and a width of the wafer-level lens stack, and
   wherein the wafer-level lens stack is built in wafer form.

* * * * *